US006372019B1

(12) United States Patent
Alferov et al.

(10) Patent No.: US 6,372,019 B1
(45) Date of Patent: Apr. 16, 2002

(54) METHOD OF AND APPARATUS FOR THE SEPARATION OF COMPONENTS OF GAS MIXTURES AND LIQUEFACTION OF A GAS

(75) Inventors: Vadim Ivanovich Alferov; Lev Arkad'evich Baguirov; Vladimir Isaakovich Feygin; Aleksandr Arkad'evish Arbatov, all of Moscow; Salavat Zainetdinovich Imaev, Ufa; Leonard Makarovich Dmitriev, Moscow Region; Vladimir Ivanovich Rezunenko, Moscow, all of (RU)

(73) Assignee: Translang Technologies, Ltd., Alberta (CA)

(*) Notice: Subject to any disclaimer, the term of this patent is extended or adjusted under 35 U.S.C. 154(b) by 0 days.

(21) Appl. No.: 09/418,867

(22) Filed: Oct. 15, 1999

(30) Foreign Application Priority Data

| | | |
|---|---|---|
| Oct. 16, 1998 | (RU) | 98118852 |
| Oct. 16, 1998 | (RU) | 98118857 |
| Oct. 16, 1998 | (RU) | 98118858 |
| Oct. 16, 1998 | (RU) | 98118859 |
| Feb. 5, 1999 | (RU) | 99102186 |

(51) Int. Cl.[7] ........ B01D 51/08
(52) U.S. Cl. ........ 95/29; 95/32; 95/34; 96/389
(58) Field of Search ........ 95/29, 31, 32, 95/34, 269; 96/389, FOR 173; 55/396, 455, 456, 457, 468

(56) References Cited

U.S. PATENT DOCUMENTS 1,917,643 A * 7/1933 Goldkamp ........ 55/396
3,442,093 A 5/1969 Rietdijk
3,528,216 A 9/1970 Garrett
3,528,217 A 9/1970 Garrett (List continued on next page.)

FOREIGN PATENT DOCUMENTS

CA 2294708 1/1999
CH 471 975 6/1969
EP 0 344 748 5/1989

(List continued on next page.)

OTHER PUBLICATIONS

Polytechnic Dictionary, "Liquefaction of the Gasi", pp. 477–478, 1989, Moscow.

Galipersin, Zelikson, Rappoport,, "a Handbook on the Separation of Gas Mixtures by the Method of Deep Cooling", Techn. Izdat. Khim, Lit . . . , pp. 13–195, 1963, Moscow.

Gupta, Lilley, and Syred, ëSwirl Flowsi, Abacus Press, 1984.

I.K. Kikoin, "ëTables of Physical Quantitiesi", Atomizdat, pp. 239–240, 1976, Moscow.

*Primary Examiner*—Duane S. Smith
(74) *Attorney, Agent, or Firm*—Daniel C. Abeles; Eckert Seamans Cherin & Mellott, LLC

(57) ABSTRACT

An apparatus for liquefying a gas has a nozzle having a convergent nozzle portion and a nozzle throat, and a divergent nozzle portion (in the case of supersonic flow), and a working section. Vanes or another mechanism for creating a swirl velocity are connected to the nozzle, to create a strong swirl velocity in gas fed to the nozzle. In the nozzle, the gas adiabatically expands, gas velocity increases and gas temperature drops, to promote the condensation of gas with formation of droplets. The gas then passes through a working section having a wall, whereby further condensation of at least a portion of the gas flow occurs and droplets of condensed gas grow. Centrifugal effects generated by the swirl velocity drive the droplets towards the wall of the working section. Condensed liquid gas droplets are separated from remaining gas in the gaseous state at least adjacent the wall of the working section. The method can be applied to liquefication of a gas or to separation of one gas or several gases from a mixture of gases.

30 Claims, 4 Drawing Sheets

U.S. PATENT DOCUMENTS

| | | | | | |
|---|---|---|---|---|---|
| 3,559,373 | A | | 2/1971 | Garrett | |
| 3,670,479 | A | * | 6/1972 | Tomlinson | 55/457 |
| 3,902,876 | A | * | 9/1975 | Moen et al. | 55/457 |
| 3,961,923 | A | * | 6/1976 | Zia Rouhani | 55/457 |
| 4,008,059 | A | * | 2/1977 | Monson et al. | 55/457 |
| 4,531,371 | A | | 7/1985 | Voronin et al. | |
| 4,699,114 | A | * | 10/1987 | Giannotti | 55/396 |
| 4,985,058 | A | * | 1/1991 | Prinsloo et al. | 55/457 |
| 5,183,481 | A | * | 2/1993 | Felder | 95/29 |
| 5,305,610 | A | | 4/1994 | Bennett et al. | |
| 5,306,330 | A | | 4/1994 | Nasikas | |
| 5,498,273 | A | * | 3/1996 | Mann | 55/396 |
| 5,976,227 | A | * | 11/1999 | Lorey | 55/396 |
| 6,056,798 | A | * | 5/2000 | Cox | 55/396 |

FOREIGN PATENT DOCUMENTS

| | | | | |
|---|---|---|---|---|
| EP | 0496128 | * | 7/1992 | |
| GB | 1 420 807 | | 7/1973 | |
| GB | 2037610 | * | 7/1980 | 95/32 |
| JP | 2-17921 | * | 1/1990 | 95/32 |
| JP | 07253272 | | 10/1995 | |
| NL | 8901841 | | 2/1991 | |
| RU | 2085267 | | 10/1994 | |
| SU | 593717 | * | 2/1978 | 96/FOR 173 |
| SU | 721708 | * | 3/1980 | 96/FOR 173 |
| SU | 1768242 | * | 10/1992 | |

* cited by examiner

METHOD OF AND APPARATUS FOR THE SEPARATION OF COMPONENTS OF GAS MIXTURES AND LIQUEFACTION OF A GAS

FIELD OF THE INVENTION

The invention relates to a method of and apparatus for the separation of the components of gas mixtures by liquefaction, and can be applied in various areas of technology, including application to liquefaction of a gas, for example for use in gas and petroleum processing including, metallurgy, chemistry and other areas of technology.

BACKGROUND OF THE INVENTION

A widely used method for the liquefaction of gas indudes compression of gas in a compressor, preliminary cooling in a heat exchanger and further cooling in an expander with subsequent expansion of the gas through a throttle valve to cause cooling and condensation. Subsequently the liquid phase is selected and separated (see Polytechnic Dictionary, 1989, Moscow, "Sovetskaya Entsiklopediya", p. 477, Ref. 1). A disadvantage of this known method is the implementation complexity in operation, and sensitivity to liquid drops in the inlet gas flow.

A known method for the separation of the components of gas mixtures by means of liquefaction includes cooling of the gas mixture in stages to the condensation temperature of each of the components and the separation of the corresponding liquid phase at each stage (see Japanese patent application No. 07253272, F 25 J 3/06, 1995, Ref. 2). A disadvantage of this known method is its small efficiency while requiring a large amount of energy.

Another known method for the separation of the components of gas mixtures by means of their liquefaction includes adiabatic cooling of the gas mixture in a supersonic nozzle and the separation of the liquid phase (see U.S. Pat. No. 3,528,217, U.S. Cl. 55-15, Int. Cl. V 01 D 51/08, 1970, Ref. 3). In this known method, the separation of the liquid phase is performed by passing the gas-liquid mixture around a perforated barrier by deflection of the flow from a simple linear flow. As a result, centrifugal forces arise due to the deflection of the flow, and under the action of these centrifugal effects, drops of liquid are displaced radially outwards. The liquid drops then pass through the perforated barrier, so as to be separated, and are collected in a container. A disadvantage of this known method is its low efficiency. The reason for this low efficiency is that under the deflection of the gas flow that moves with supersonic speed, shock waves occur, which raise the temperature of the gas, and this leads to the unwanted vaporization of part of condensed drops back into the gaseous phase.

Among the known methods, a method that is the closest to the present invention consists of the separation of gas components by their liquefaction (as disclosed in U.S. Pat. No. 5,306,330, U.S. Cl. 95-29, Int. Cl. V 01 D 51/08, 1994, Ref. 4). This known method can be used to separate the components of a gas mixture. (See column 1, lines 5–10, Ref. 4).

The method in Ref. 4 includes cooling of a gas in a supersonic nozzle and the separation of the liquid phase. A shock wave is present at the nozzle, and the invention relies on droplets, already formed, having a greater inertia. Hence, the droplets maintain a higher velocity downstream, facilitating their separation by centrifugal effects. To separate the liquid phase, the cooled gas flow, which contains already drops of a condensed liquid phase, is deflected through a curve, away from the initial axis of the nozzle. As a result of the deflection of the flow, under the action of the inertia, and centrifugal forces, the droplets with a higher velocity are displaced radially outwards from the axis of the flow. The flow is then divided into two channels, and one portion of the flow containing the droplets is passed along one channel, and another portion of gas flow, substantially dry and free of liquid droplets, passes along another channel. This technique bears some similarities with Ref. 3, in that the gas is effectively rotated or caused to turn about an axis perpendicular to the original axis and flow direction of the nozzle.

A disadvantage of this known method is its low efficiency. This is due to the fact that under such a deflection of the gas flow, shock waves again occur, and thus the temperature of the flow increases, which leads to the unwanted evaporation of part of the condensed droplets.

Moreover, when liquefying a selected component, the partial pressure of the remaining gas phase is reduced. Hence, for a more complete (subsequent) liquefaction, one must provide for a decrease of the static temperature of the flow. This can be achieved by means of an increase of the rate of the adiabatic expansion of the flow, and hence by the corresponding increase of its Mach number. This requires a substantial reduction of the output pressure of the flow, which drastically reduces the efficiency of this technology, in terms of power requirements.

There is yet another known device for the separation of the components of gas mixtures and isotopes that contains an evaporator, a curvilinear supersonic nozzle, a separator in the form of a cooled knife, and receivers for the separated components (see the description to the patent pending of Russian Federation No. 2085267, V 01 D 59/18,1997, Ref. 5). Disadvantages of this known device are the complexity of the construction and low efficiency with respect to both the energy efficiency of the process and to the extent of the separation.

All the above methods of Ref. 2–5 have a common disadvantage that significantly reduces their efficiency and that results from the existence of a shock wave due to the change of the gas flow direction. These shock waves both heat the gas, leading to vaporization of the drops, and significantly decrease the total head at the outlet of the apparatus.

The present invention is intended to improve the efficiency of the separation of gas mixtures by means of their liquefaction and of the liquefaction of a gas, and is intended to provide separation of gas components at the instant of liquefaction.

This desired result is accomplished, in the present invention, by the provision of a method for the liquefaction, which includes adiabatic cooling of a gas mixture or a gas in a supersonic or subsonic nozzle and the separation of the liquid phase. Moreover, the present invention modifies the partial pressure of the gas or each component in the mixture. Then, in one aspect of the invention, the partial pressures in the initial mixture can be modified in the device so as to provide a higher temperature of condensation of one component, that has a lower temperature of condensation at atmospheric pressure than the temperature of condensation of another component with a higher temperature of condensation at atmospheric pressure. The geometry of the nozzle is chosen to preserve in the gaseous phase, in the course of cooling, the other component with the higher temperature of a condensation at atmospheric pressure and the liquefaction of the one component that has a lower temperature of a condensation at atmospheric pressure is in an amount that is sufficient to dissolve in it the gaseous phase of the bulk of the component that has a higher temperature of condensation at atmospheric pressure.

SUMMARY OF THE INVENTION

In accordance with a first aspect of the present invention, there is provided a method of liquefying a gas, the method comprising the steps of:

(1) applying a swirl velocity to the gas;

(2) passing the gas, with the swirl velocity, through an expansion nozzle;

(3) permitting the gas flow to expand adiabatically downstream from a nozzle in a working section having a wall, whereby the gas cools and at least a portion of the gas flow condenses to form droplets;

(4) permitting centrifugal effects generated by the swirl velocity to drive the droplets towards the wall of the working section; and (5) separating condensed liquid gas droplets from remaining gas in the gaseous state at least adjacent the wall of the working section.

Preferably, the method includes separating condensed liquid from the gas flow downstream from the nozzle at a location spaced a distance L from the dew point, where $L=V\tau$, where V is the speed of the gas flow at the outlet of the nozzle and $\tau$ is the time taken for condensed droplets of gas to travel from the axis of the nozzle to a wall of the working section. By the dew point we mean the zone inside the nozzle in which the change from the gas phase into the liquid phase starts.

The condensed droplets can be separated by any suitable means, for example through an annular slot or through perforations.

The method can be applied to a gas comprising a plurality of separate gaseous components having different properties, and the method further comprising adiabatically expanding the gas such that at least two gaseous components commence condensation at different axial locations downstream from the nozzle throat, to form the droplets and separating out the droplets of these gaseous components independently from each other gaseous component.

In such a case, there is then provided a separation device for each component at a location which is a distance $L_i$ from the axial location at which a corresponding gaseous component condenses, where $L_i$ is determined by the relationship $L_i=V_i \times \tau_i$; where $L_i$ is the distance between the dew point of the ith gas component to a location at which the ith gaseous component is separated; $V_i$ is the speed of the gas flow at the dew point of the ith gaseous component and $\tau_i$ is the time for droplets of the ith gaseous component to travel from the axis of the nozzle to the wall of the working section.

For some gases, it may be sufficient to generate subsonic velocities, but in general it is expected that it will be necessary to generate a substantially sonic velocity in the gas close to the nozzle throat, so as to cause the gas to expand supersonically in the nozzle and in the working section.

Another aspect of the present invention provides an apparatus for liquefying a gas, the apparatus comprising:

(1) means for imparting a swirl component of velocity to a gaseous flow; and (2) downstream from said swirl generation means, a nozzle comprising a convergent nozzle portion connected to the swirl generation means and a nozzle throat and a divergent nozzle portion (and optionally, particularly in the case of a supersonic nozzle), and a working section, whereby in use, the gas adiabatically expands in the nozzle and in the working section, to cause condensation of at least some of the gas, thereby generating droplets of condensed gas.

In a particular aspect of the present invention, it is applied to a gas having a plurality of gaseous components in the mixture; and the partial pressures of these components is such that, when the gas flow passes through the nozzle, one component, that has a lower temperature of condensation at atmospheric pressure than the temperature of condensation of another component, has a partial pressure such as to cause it to condense first during adiabatic expansion. For example, for natural gas a high partial pressure for methane can cause it to condense first in an amount sufficient to dissolve the ethane, still in the gaseous state.

For this aspect of the invention, a geometry of the nozzle is selected so as to ensure the preservation in the gaseous phase, in the course of cooling, of the component with the higher temperature of condensation at atmospheric pressure; more particularly, the geometry of the nozzle is chosen to ensure the condensation of the component that has a lower temperature of condensation (at atmospheric pressure) in a quantity sufficient to dissolve in it the bulk of the gaseous phase of the component that has a higher temperature of condensation.

This permits one to increase the efficiency of the separation of gas fractions for the following reason. In the gas flow, the gas component that has a lower temperature of condensation at atmospheric pressure is then the first component that starts to condense. This leads to the appearance of a lot of small drops (a fog), which dissolve in themselves the bulk of the component that has a higher temperature of condensation (at atmospheric pressure) and thus removes the latter component from the mixture.

This also permits one to increase the efficiency of the separation of gas fractions in a mixture because the gas component that has a higher temperature of condensation, which is preserved in the gaseous phase in the course of the adiabatic cooling, is almost completely removed from the mixture by dissolving it in the liquid phase of the other component, which is separated therefrom in a known way. Correspondingly, to remove the component that is in the gaseous phase, a sufficient amount of the other component (in the liquid phase) is needed to ensure the dissolving in it of the gaseous component.

The geometry of the nozzle that ensures the above conditions is chosen on the basis of the known laws of thermodynamics of gas and the known initial data of the gas flow, namely, the pressure at the entrance to the nozzle, the temperature of gas, the chemical composition of the mixture and the initial relation among the partial pressures, and also on the basis of reference data on the solubility of gaseous components in liquids and liquefied gases under various temperatures and pressures known at the technological level (for instance, see "A Handbook on the Separation of Gas Mixtures by the Method of Deep Cooling", I. I. Gal'perin, G. M. Zelikson, and L. L. Rappoport, Gos. Nauchn.-Tekhn. Izdat. Khim. Lit., Moscow, 1963).

It is preferred for the nozzle and swirling flow to be designed to produce an acceleration of around and above 10,000 g (approximately $10^5$ m/sec$^2$). This acceleration is calculated on the basis that the swirling gas can be treated as a rotating solid body, i.e. the angular rotation is constant from the axis to the boundary of the nozzle. It will be appreciated, that this is a theoretical ideal model; a close approximation to this model can be achieved as a result of high swirling velocity gradients that lead to large viscosity forces.

Consequently, the actual rate of acceleration will be determined by the known formula $\omega^2 r$, where $\omega$ is the angular velocity and r is the radius. In other words, the rate of acceleration will vary in direct proportion to the radius.

The figure of 10,000 g relates to the acceleration at the outer edge of the swirled flow, i.e. adjacent the nozzle wall. It can be achieved, with r=0.1 m and $\omega$=1,000 $sec^{-1}$.

It can also be noted that instead of an exact acceleration figure, the acceleration can be defined in functional terms. Thus, the key requirement is that the losses due to friction should not be too high, i.e. the angular velocity should not be too great, and at the other extreme, drops of a diameter less than 5 microns should be caused to travel to the wall of the working section within a reasonable length. Additionally, the pressure drop should be competitive with other techniques.

At the end of working section a device for the separation of liquid (in mixture with the part of gas flow directed in the boundary layer) is provided.

The liquid withdrawal device can be adjacent a supersonic diffuser; moreover, the liquid withdrawal device and the supersonic diffuser can be essentially integral with one another. The supersonic diffuser provides for the partial transformation of the gas flow kinetic energy to an increased pressure. Thus, the liquid withdrawal device can include an edge or lip in the working section which simultaneously forms a leading edge of the supersonic diffuser channel. Such a configuration is chosen in order to increase the efficiency of the supersonic diffuser, strongly, of the order of 1.2 to 1.3 times, as compared to a standard construction of the supersonic diffuser.

Downstream from the supersonic diffuser, a subsonic diffuser is preferably provided, which both provides for further recovery of the axial kinetic energy and may include a device for recovery of the rotational kinetic energy, so as to remove the swirl component of the flow. The location of this device is in a zone where the Mach number M is 0.2–0.3, so as to give the best efficiency.

BRIEF DESCRIPTION OF THE DRAWING FIGURES

For a better understanding of the present invention and to show more clearly how it may be carried into effect, reference will now be made to the accompanying drawings which show preferred embodiments of the present invention, and in which.

DETAILED DESCRIPTION OF THE PREFERRED EMBODIMENTS

Figure 1:
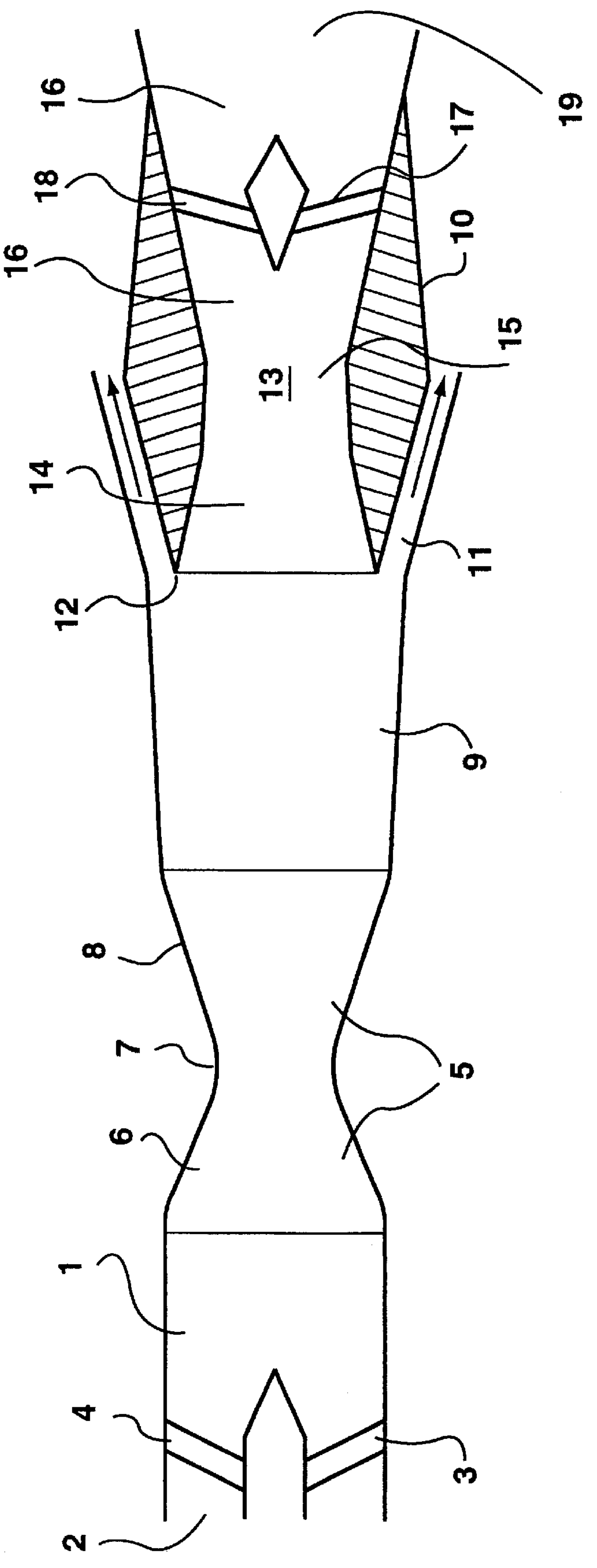
FIG. 1 is a longitudinal sectional and schematic view of a first embodiment of a nozzle in accordance with the present invention.

In FIG. 1, there is shown a first embodiment of a device in accordance with the present invention.

Referring to FIG. 1, a premix chamber 1 has an inlet 2 for gas. Gas then flows through a swirl generation device 3, which includes vanes or blades 4 supporting a central axial element. The blades 4 are configured to impart the desired swirl velocity.

Downstream from the premix chamber 1, there is a nozzle 5. The nozzle 5 comprises a convergent portion 6, a nozzle throat 7 and a divergent portion 8 (the last portion 8 is present only in case of supersonic nozzle).

Extending from the nozzle 5 is a working section 9. The working section 9 is shown in FIG. 1 as distinct from the divergent portion 8 of the nozzle 5, but it will be appreciated that these two portions essentially serve the same function, namely enabling progressive expansion of the gas, thereby causing acceleration of gas flow, a decrease in pressure, a decrease in temperature (the major or significant portion of these effects preferably occur in the nozzle 5, rather than in the working section 9), and consequently promoting condensation of selected components of the gas flow. As shown, the divergent portion 8 (when it is present) can have a much larger angle of divergence, as compared to the working portion 9.

Downstream from the working section 9, there can be installed a diffuser body 10 mounted coaxially with respect to other elements of the device. The outside of the diffuser body 10 and walls extending from the working section 9 serve to define an annular slot 11. The diffuser body 10 has a leading edge 12, which provides an inner, leading edge of the slot 11, and also a leading edge of a supersonic diffuser.

The diffuser body 10 has a central channel 13, which provides, sequentially, a supersonic diffuser 14, an intermediate section 15 and a subsonic diffuser 16.

The subsonic diffuser 16 can include a means or device 17 for recovering the rotational kinetic energy, which comprises vanes or blades 18 connected to a coaxially mounted element. Downstream, there is an outlet 19 for discharge of separated gas, with recovered pressure.

The vanes 18 are configured to convert the rotational kinetic energy to axial kinetic energy. This axial kinetic energy could then be recovered as increased pressure in the downstream portion of the subsonic diffuser 16, but before the outlet 19.

The geometry of the subsonic and supersonic (in the case of supersonic nozzle) parts of the nozzle is chosen based on requirement of absence of flow separation at the walls. The laws of the diffusers' square change along the axis are well known in the aerodynamics (Ref.8). The divergence angle of the working section is chosen with consideration to the growth of the boundary layer and in case of small content of the liquefied component (3 to 6%), this angle would be 0.5° to 0.8° on each side. In case of a larger content of liquefied component, condensation in the working section can result in a significant decrease in the volumetric gas flow rate; that effect should be taken into account in determining the geometry of the working section walls.

The chamber 1 is provided with a means or device 3 for imparting a swirl component to the gas flow. This could be, for example, instead of the vanes 4 shown, a cyclone, a centrifugal pump, a tangential supply of the gas, etc.

Figure 4:
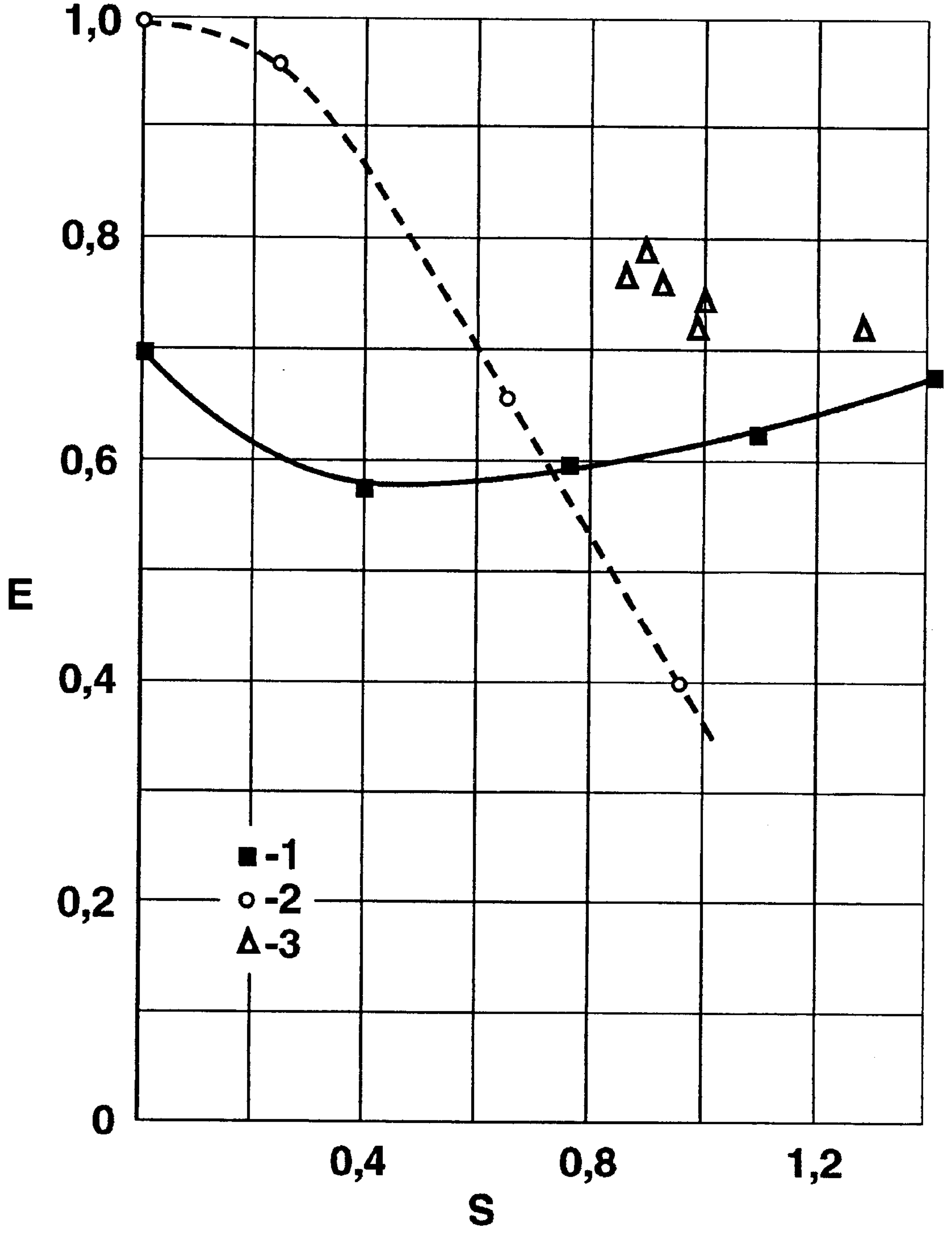
FIG. 4 is a graph showing variation of swirling efficiency E with swirling parameter S.

Reference will now be made to FIG. 4, which is taken from (Gupta A., Lilley D., Syred M. Swirl flows, Abacus Press, 1984, for example, Ref. 6) and which shows the variation of swirling efficiency E with a swirling parameter S. The swirling efficiency E is defined as the ratio of the rotational component of the kinetic energy to difference in the total head between the input and output of the device.

$$S = \frac{G_\theta}{G_x \cdot R}$$

where $G_\theta$=the flow of angular momentum in radial direction;

Gx=flow of angular momentum in the axial direction; and

R=radius of device.

FIG. 4 shows a variation of the parameters E and S for different types of swirling device. The first device, indicated by "■" in the figure is an adaptive block (See Ref. 6). A second device, indicated at "O", is a swirling device with axial and tangential input (See Ref. 6). Finally, as indicated at "Δ", there is a swirling device with guide vanes, creating the swirl component (See Ref. 6).

It can be seen that the first type of device gives a fairly uniform efficiency across the range of values of S. The second device, B, shows a swirling efficiency that drops off rapidly as the parameter S increases. The third device, indicated at C, shows a cluster of results, all showing an efficiency between 0.7 and 0.8 for values of S greater than 0.8.

A description will now be given of the method of the present invention, as effected in the device of FIG. 1.

Figure 3:
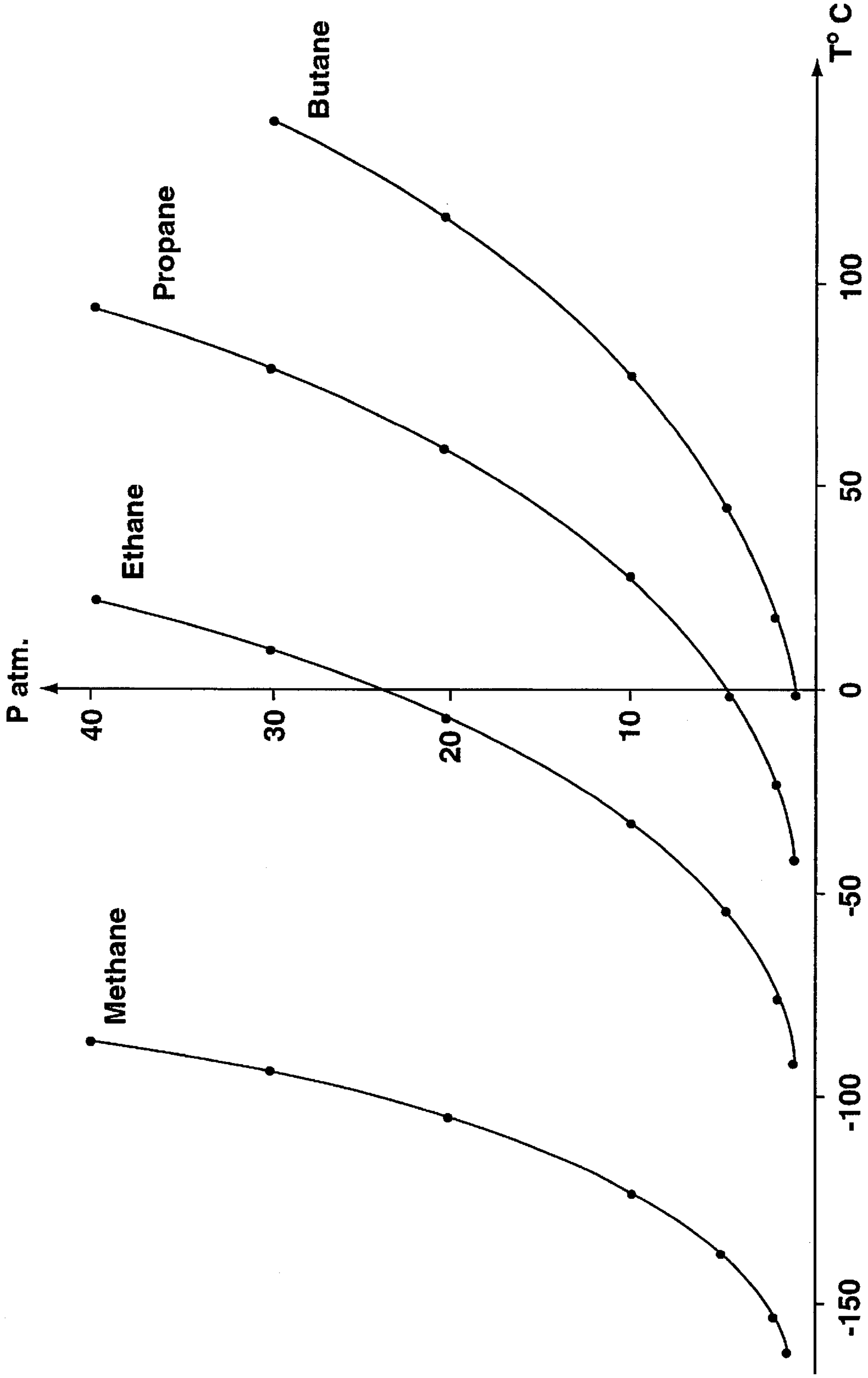
FIG. 3 is a graph showing the variation of partial pressure with temperature for methane, ethane, propane and butanes.

The inlet 2 of the premix chamber 1 is supplied with a flow of the gas mixture to which a swirl component of velocity has been imparted. This provides a centrifugal acceleration in the flow along its passage through the nozzle and enables separation as detailed below. The parameters of the gas flow at the entrance, to ensure that the required values of the acceleration can be achieved, are calculated on the basis of the laws of hydrodynamics and the geometry of the nozzle. From the premix chamber 1, the gas mixture flows to the nozzle 5, where it is cooled as a result of the adiabatic expansion. At a distance from the nozzle throat (in the supersonic case), condensation starts for the gas component that has a higher temperature of condensation, determined from the partial pressures of the components of the gas mixture used. This is determined on the basis of computations and with the use of reference data. Table 1 below sets out information on the condensation of some gases in dependence on their pressure that is taken from the handbook "Tables of Physical Quantities", Ed. by I. K. Kikoin, Atomizdat, Moscow, 1976, pp. 239–240 (Ref. 7), which gives suitable exemplary data. On the basis of these data, curves are drawn, which are shown in FIG. 3 and can be used to determine process conditions. For instance, at normal pressure (1 atmosphere), the temperature of condensation (liquefaction) of methane is −161.5° C. and that of ethane is −88.6° C. However, if in a gas mixture the partial pressure of ethane is 1 atmosphere and of methane is 40 atmospheres, then methane condenses first at a higher temperature of −86.3° C. (See Example 2 below).

The formation of drops or droplets in the flow starts with the formation of clusters of molecules, where a "cluster" is considered to be a group of united of combined molecules numbering not more than 5–10. Clusterization of the flow happens in a time scale in the order of $1.5\times10^{-8}$–$10^{-7}$ seconds, i.e. it is almost in thermodynamic equilibrium. Accordingly, the divergence of the nozzle walls along the axis, or in other words, the velocity of the gas, as it cools, is not relevant.

The mechanism causing clusters to unite is initially Brownian motion, and as the clusters grow they unite due to turbulent mixing within the flow.

The conditions which determine the shape of the nozzle are: minimization of the losses of the total head for the flow, because of losses due to friction; a consequent requirement for a smooth wall to the nozzle; and the divergence angle of the nozzle such as to provide for continuous flow, with the flow attached to the walls of the nozzle. The aerodynamic requirements for a nozzle wall, to meet these conditions, are well known.

Below, in Equation (1), there is given a relationship between the cross-sectional area of the nozzle and the Mach number. The equation includes a ratio of the cross-section at any particular location to the cross-section of the throat, which enables the Mach number to be calculated. From the Mach number M, and the known inlet temperature and pressure in the premix chamber, the temperature of the flow can be calculated. As mentioned above, the contour of the nozzle is chosen by known methods.

Accordingly, it will be understood that the location on the axis of the dew point for the particular gaseous component depends on the divergence angle of the nozzle. As is known, the divergence angle is limited by a number of factors. For a supersonic nozzle, usually the divergence angle, for each side, is in the range of 3 to 12°. Accordingly, for a given divergence angle and given initial parameters and gas composition, the dew point depends only on the Mach number M of the flow or, in other words, on the ratio of the cross-section at any point and the cross-section of the throat of the nozzle.

The dew point can be calculated on the basis of calculations, using a computer program, utilizing the thermodynamic properties of the gas, the nozzle parameters, etc. Additionally, allowance should be made for deviation between the thermodynamic equation of state for the natural gas and the thermodynamic equations for an ideal gas. On this basis, the position of the dew point can be precisely determined in relation to the throat.

It can be noted that the location of the sonic surface, at which the flow velocity is exactly equal to sonic velocity, does not coincide with the exact nozzle throat, but is located slightly downstream, in the direction of the supersonic expansion of the flow. Velocity here means the total velocity, i.e. the swirl velocity plus the axial velocity (summed as vectors). Assuming a constant angular velocity, this gives a swirl velocity that is proportional to radius, and hence the total velocity increases with the radius.

TABLE 1

| T ° C. | P, Atm | | | | | | |
|---|---|---|---|---|---|---|---|
| Substance. | 1 | 2 | 5 | 10 | 20 | 30 | 40 |
| Butane | −0.5 | +18.8 | 50.0 | 79.5 | 116 | 140 | |
| Propane | −42.1 | −25.6 | +1.4 | 26.9 | 58.1 | 78.7 | 94.8 |
| Ethane | −88.6 | −75.0 | −52.8 | −32.0 | −6.4 | +10.0 | 23.6 |
| Methane | −161.5 | −152.3 | −138.3 | −124.3 | −108.5 | −96.3 | −86.3 |

Under normal or atmospheric pressure, propane is condensed (liquefied) at a higher temperature than for ethane (−42.1° C. for atmospheric pressure). However, if the partial pressure of propane in the gas mixture is 1 atmosphere and that of ethane is 10 atmospheres, then the temperature of condensation of ethane is increased up to −32° C. and this becomes higher than the temperature of condensation of propane by almost 10° C. We can similarly choose the corresponding partial pressures for the pair butane-propane and butane-ethane. For example, under normal or atmospheric pressure, the temperature of condensation for butane is −0.5° C., i.e. it is higher than the temperature of condensation for propane by 41.6° C. However, if the partial pressure of butane is equal to 1 atmosphere and the partial pressure of propane is more than 5 atmospheres, then (see Table 1) the temperature of condensation of butane becomes lower than that for the condensation of propane.

As a result of condensation of one of the components, a lot of small drops of liquid phase (a fog) appear in the nozzle with the gaseous phase of the other component dissolved in the drops. Since the flow in the nozzle has a strong swirl component, it follows that, under the action of centrifugal forces, the condensed drops of the liquid phase are thrown to the walls of the nozzle and form a film on these walls. The place at which the starting point of the condensation is located can be defined by computations with the use of the known equations of hydrodynamics and thermodynamics. The time of motion of the drops of the liquefied component from the center of the nozzle to the walls is computed in a similar way.

In the area of the working section in which the drops reach the walls, means can be provided to separate out the liquid component. For example, this could be a perforated section of the wall, or as shown, an annular slot 11. On the basis of the reference data presented in Ref. 7, a computation is made of the amount of the liquefied or condensed component, that is needed to completely dissolve the maximal practically achievable portion of the gaseous phase of the other component that has a higher temperature of condensation at atmospheric pressure. Thus, on the basis of the initial data on the parameters of the gas mixture and using the known relationships that follow from the laws of thermodynamics, the geometry of the nozzle was calculated that provides condensation of the component that has a lower temperature of condensation at atmospheric pressure in an amount that is sufficient to dissolve the maximal practically achievable portion of the gas phase of the other component whose temperature of condensation at atmospheric pressure is higher, and this amount must ensure the preservation of this fraction in the gaseous phase in the entire course of the process of cooling.

As a result, in the process of realization of the proposed method, the liquefied or condensed component of the gas mixture whose temperature of condensation is lower almost completely dissolves in itself the gaseous phase of the other component and is removed for the future separation by one of the known methods, and the gas with lower temperature of condensation that is purged of the other component is separated.

The profile of the nozzle, and in particular the ratio between output and throat cross-sections are determined in accordance with the following equation:

$$\frac{F_*}{F} = M\left[\frac{2}{\gamma+1}\left(1+\frac{\gamma-1}{2}M^2\right)\right]^{-\frac{\gamma+1}{2(\gamma-1)}} \quad (1)$$

where

F* is the cross-sectional area of the nozzle throat 2;

F is the cross-sectional area of the nozzle at an arbitrary point;

M is the Mach number; and $$\gamma = \frac{C_p}{C_v}$$

is the adiabatic exponent (ratio of specific heats).

For instance, the computation was performed for the Mach number M=1.33 and for the value γ of the mixture equal to 1.89 (this value was determined in a computational way for the given gas mixture with regard to the effect of superliquefiability and the Joule-Thomson effect for the pressure intervals used).

F* was to be chosen based on the required flow rate through the device;

Mach number at the output of the nozzle was to be chosen based on the temperature requirements of the designed process;

Equation (1) was used to calculate the output cross-section of the nozzle based on the desired M;

The divergence angle of the nozzle was to be chosen based on the requirements expressed above, and this consequently determines F(x) for any x along the axis;

Mach number M (x) at any point x along the axis of the nozzle can be calculated from equation (1).

The pressure along the axis was calculated in accordance with the following equation:

$$P_{st} = P_0\left[1+\frac{\gamma-1}{2}M^2\right]^{\frac{-\gamma}{\gamma-1}} \quad (2)$$

where $P_{st}$ indicates static pressure at the wall of the device;

$P_0$ indicates the initial pressure upstream in the premix chamber;

γ again is the ratio of the specific heats; and

M is the Mach number.

In accordance with equation (1), the Mach number is related to the ratio of the two cross-sectional areas, namely the cross-sectional area at an arbitrary or particular point of the nozzle to the cross-section of the throat.

Once the nozzle profile has been determined, then the Mach number M, at any point a distance along the axis, can be determined from equation (1). From the Mach number M, equation (2) can be used to calculate the static pressure $P_{st}$ at that location.

As a result of the boundary layer growth in the working section, in the supersonic regime, flow drag occurs and consequently there is a pressure increase along it. At certain distances, the pressure can increase so much that supersonic flow breaks down. This is associated with the onset of a shock wave. The flow becomes unstable, and the shock wave location moves axially up and down the nozzle. This working regime is unacceptable.

For this reason, in the present invention, there is a combination of supersonic and subsonic diffusers. The other purpose of the diffusers is to convert the kinetic energy of the flow to a pressure increase that is important for the total efficiency of the method and device. The general construction of the supersonic and subsonic diffusers is well known in the aerodynamic technology. In this invention, these diffusers are applied with parameters selected to achieve the main objectives of the invention.

It is known that the pressure recovery efficiency increases significantly, where boundary layer separation is prevented. In the present invention, in the case when annular slots are used for liquid removal, the boundary layer is also removed from the gas flow (clearly, downstream from a slot 11, a new boundary layer will develop, but it will be thinner than the boundary layer skimmed off from the flow). With this function in mind, the supersonic diffuser 13 is installed in such a way that its leading edge 12 is simultaneously the leading or inside edge at the slot 11. Therefore, the boundary layer can be practically completely removed from the main gas stream that enters the supersonic diffuser 13. This configuration gives an opportunity to increase the diffuser efficiency in a range 1.2–1.3 times the conventional efficiency and therefore increases the total pressure at the outlet of the apparatus.

For the same purpose the device 17 can be installed in the subsonic diffuser device 16, that transforms the tangential or swirl component of gas velocity to an axial velocity; in the section following the subsonic diffuser 16, the bulk of gas kinetic energy is transformed into the pressure increase. An efficient location of the swirl recovery device or means 17 is at the zone of the subsonic diffuser where the axial velocity on the axis corresponds to a Mach Number M in the range 0.2–0.3. The installation of the swirl recovery device 17 results in an increase in pressure by a further 3–5%, that is important for the improvement of the total efficiency of the apparatus.

Accordingly, the present invention can include, at the end of the working section 9, a combination of supersonic and subsonic diffusers 14, 16. Also, as mentioned, at the end of the subsonic diffuser 16, a device 17 can be installed that converts the swirled flow into an axial flow, which in turn recovers the rotary energy and decreases the total energy losses due to friction. The construction of such elements are known in the literature and one example can be found in Abramovich G. N., Applied gas dynamics, edit. N5, Nauka, 1991, Ref. 8.

In some cases the purpose of the apparatus, (required pressure, temperature etc.) is such that these parameters can be achieved without working in the supersonic regime, i.e. $M \leqq 1$ everywhere in the device. In this case the nozzle shape downstream from the exit of the nozzle will be close to a cylindrical channel.

Consequently in this case, it is only necessary to install a subsonic diffuser, which is also a device for recovering the rotary kinetic energy.

Note that in the working section 9, a number of variations of the thermodynamic parameters can take place. Principally, due to the condensation of liquid into droplets, the effective volume of the gas reduces, as, for a given mass, the liquid volume is, typically, less than 10 times the equivalent gaseous volume. This effect is equivalent to the increase in the cross-section of working section 9, as condensation of part of the gas permits the remaining gas to expand. This consequently causes the value of M to increase, which results in a drop in static temperature and static pressure in a supersonic flow in the channel, and vice versa in the case of subsonic velocity.

EXAMPLE 1

A separation was performed of a gas mixture that contained methane and ethane. The temperature of condensation of methane at atmospheric pressure is −161.5° C. and that of ethane is −88.63° C. To achieve a state at which, during the cooling of the mixture, the temperature of condensation of methane is higher than that of ethane, one determines the required partial pressures of gases in the mixture on the basis of curves represented in FIG. 3 or tabular data (see Table 1). For instance, at a partial pressure of ethane of 1 atmosphere, its temperature of condensation is −88.63° C. and the temperature of condensation of methane at a partial pressure of 40 atmospheres is −86.3° C. Hence, in a gas flow passing through the supersonic nozzle, the partial pressure of ethane must be less than or equal to 1/40 (2.5%) of the partial pressure of methane and, as follows from the computations, must contain 95.3% of methane and 4.7% of ethane by mass.

On the basis that the entrance of the supersonic nozzle was supplied with gas at a pressure of 64 atmospheres and a temperature of 226° K, the geometry of the nozzle was determined. Here it was taken into account that, for the complete dissolving of the ethane in the condensed or liquid mixture (Ref. 7), it was necessary that at least 8% of the methane contained in the mixture condense into the liquid phase and that the ethane be retained in the gas phase throughout the entire cooling of the gas mixture. In other words, the ethane itself did not condense, but was instead dissolved in the liquid methane. It was also taken into account that, in the course of cooling, the mass relationship between the components in the gaseous phase was changed (and hence the same holds for the partial pressures, which influence the temperature of condensation) because one of the components was condensed and the other component was removed from the mixture due to its dissolving in the liquid phase. It has been shown by experiments that, as a result of the process of condensation, changes in the proportions of methane and ethane in the mixture led to an increase in the difference between the temperatures of their condensation and ensures the preservation of ethane in the gaseous phase in the course of the entire process of cooling.

On the basis of the computations performed according to what was said above, the geometry of the nozzle was chosen, namely, the diameter of the critical section of the nozzle was 20 mm, the total length of the device was 1,200 mm (all of the nozzle, working section and both diffusers), and the walls of the nozzle are profiled in accordance with the equation (1) above.

The location for the separation of the liquefied methane with the gaseous ethane dissolved in it was also computed; this point is at the distance of 500 mm from the nozzle throat.

Thus, in this implementation of the method, the entrance of the premix chamber of the apparatus was supplied, through tangential slits, by a gas flow that contained 4.7% of ethane and 95.3% of methane by mass at a pressure of 64 atmospheres with a flow rate of 21,000 $nm^3$ per hour (nm=normal or standard cubic meter), with the throat diameter being 20 mm and device length of 1200 mm. This ensured the passage of gasses through the nozzle with a speed of 400 m/s and provided for their adiabatic cooling. As a result, 8% of the methane supplied to the entrance of the nozzle was liquefied and passed out through the slot 11 to a receiver and this liquid methane also contained almost all the ethane dissolved in methane. Further on the methane was separated from the ethane by a known method.

EXAMPLE 2

In another version of the apparatus designed for methane liquefaction or condensation, the following parameters were used: the interior diameter of the premix chamber 1 was 120 mm, the diameter of the throat section 7 of the nozzle 5 was 10 mm, the length of the nozzle plus working section was 1,000 mm, and the walls of the nozzle are profiled according to equation (1) above.

To impart the swirl velocity to the gas flow, instead of the arrangement shown in FIG. 1, slits of 2 mm width were provided in the walls of premix chamber 1 and at an angle of 2° to the tangent, to ensure the tangential supply of gas.

On the basis of calculations it was established that, to ensure the centrifugal acceleration not less than 10,000 g in the gas flow through the nozzle, the gas flow must be supplied at a pressure of not less than 50 atmospheres. On the other hand, on the basis of calculations it was established that, for the chosen geometric configuration of the nozzle, the methane condensation process is efficient provided that the supply of the gas is at a pressure of 200 atmospheres, which was taken as the operating pressure.

On the basis of this data, the total velocity of the gas flow in the nozzle was calculated, which turned out to be equal to 544 m/s, and the position of the dew point for methane (T=173° K under the pressure 32 atmospheres) was at the distance of 60 mm from the nozzle throat. The optimal place for the separation of the liquid phase was also established by computation, and this point was calculated to be at a distance of 600 mm from its dew point.

At the entrance of the premix chamber 1, gaseous methane was supplied through tangential slits under a pressure of 200 atmospheres at a rate of 18,000 $m^3$ per hour (nm=normal cubic meter); and this results in a flow with a strong swirl component passing through the nozzle 5 with the total velocity 544 m/s and with the centrifugal acceleration in the flow equal to 12,000 g. As a result, the liquefied methane enters the receiver of the liquid phase through the ring-shaped slit at the rate of 1.86 kg/s.

Figure 2:
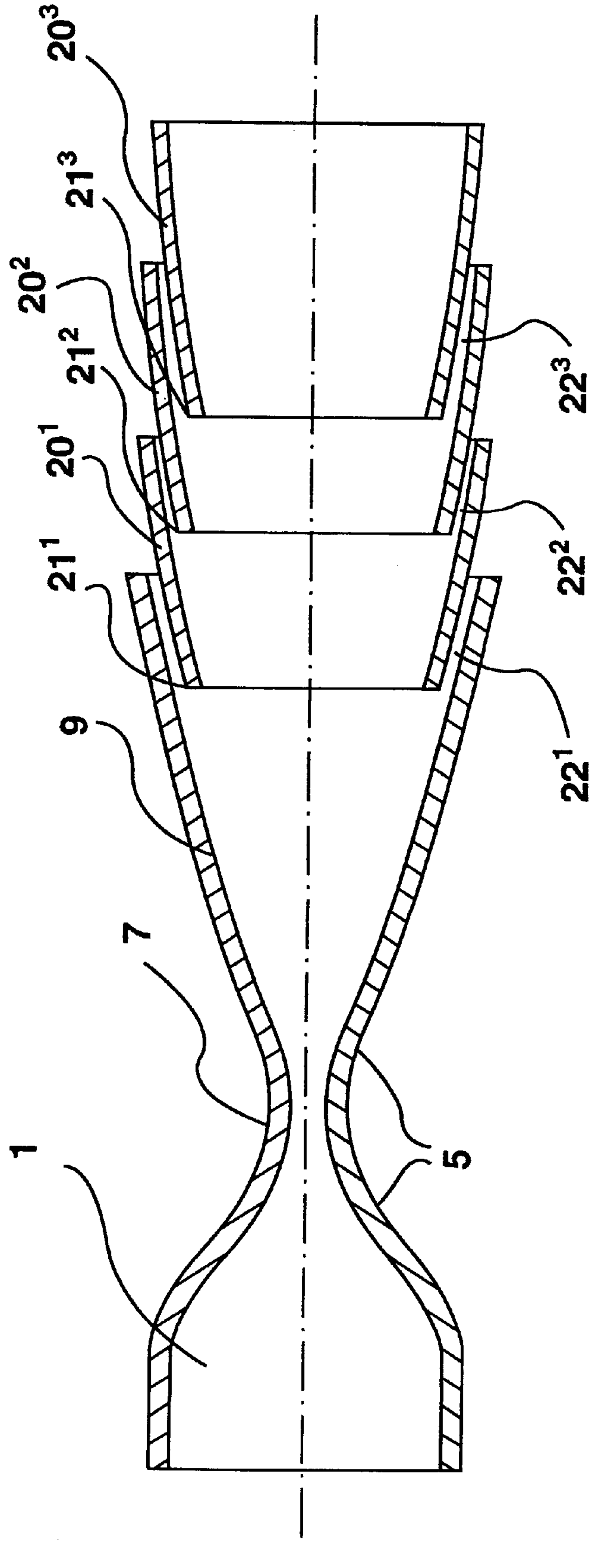
FIG. 2 is a longitudinal sectional and schematic view of a second embodiment of a nozzle in accordance with the present invention.

Reference will now be made to FIG. 2 which shows a second embodiment of the present invention. In this second embodiment, many of the components are the same as in the first embodiment, and for simplicity, these like components are given the same reference numerals and a description of these components is not repeated.

More particularly, the structure of the diffuser body 10 and supersonic and subsonic diffusers 14, 16 is not shown in FIG. 2. However, it will be understood that, to obtain high efficiency, this diffuser structure would also be incorporated in the FIG. 2 embodiment, integral with the last slot 22$^3$described below.

Referring to FIG. 2, there is now provided a plurality of generally frusto-conical sections, indicated as 20$^1$, 20$^2$, 20$^3$, having respective leading edges 21$^1$, 21$^2$, 21$^3$, corresponding to the leading edge 12. This in turn creates a series of annular slots 22$^1$, 22$^2$, 22$^3$ corresponding to the slot 11. Each of these frusto-conical sections 20$^1$, 20$^2$, 20$^3$ could be shaped to provide the desired aerodynamic characteristics, and could have a varying divergence angle. In effect, one can consider this to be a continuously expanding working section, with each of the conical sections 20$^1$, 20$^2$, 20$^3$ progressively skimming off a different portion of the flow. Each such portion of the flow contains a different liquid component, e.g. a liquid component enriched in a desired component of the original flow.

In both FIGS. 1 and 2, instead of the annular slots 11 or 22$^1$, 22$^2$, 22$^3$, it is possible to provide a perforated area, or any other suitable technique for separating the flow adjacent the wall of the working section. Note that in all cases, it is expected that, in addition to the collected droplets, a portion of the gas flow will be diverted through the annular slots, perforations, etc. It is worth noting that the velocity in the slots 21$^1$–22$^3$ is of minor importance because the flow in the slots contains a lot of liquids.

The desired result of the present invention is accomplished due to the fact that the method of separation of components of gas mixtures by their condensation includes adiabatic cooling of a gas mixture in a supersonic nozzle and separation of the liquid phase; moreover, before the nozzle is supplied with the gas flow, this flow is provided with a swirl velocity, generating a radial acceleration at not less than 10,000 g (g is acceleration due to gravity) in the flow while it passes through the nozzle. The separation of the liquid phase of each of the components is performed at a distance $L_i$ from the dew point of each of the components; this distance is determined by the relation $$L_i = V_i \times \tau_i \quad (3)$$

where $L_i$ is the distance between the dew point of the ith gas component to the place of separation of the liquified component (metres); $V_i$ is the speed of the gas flow at the dew point of the ith gas component (metres/second); and $\tau_i$ is the time for the drops of the ith liquified component to travel from the axis of the flow to the wall of the nozzle (seconds).

Providing a strong swirl is applied to the gas flow before its supply to the nozzle, the efficiency of the method increases for condensation and separation of gas fractions because, due to this swirl component, centrifugal forces occur in the gas flow along its passage through the nozzle 5 and working section 9, and these forces lead to the separation of the drops of the liquid phase from the main gas flow. Consequently, unlike the prior art proposals, there is no necessity to deflect the flow, which leads to a temperature rise.

The swirl velocity should be high enough to generate centrifugal accelerations not less than 10,000 g the flow while this flow passes through the nozzle and this also increases the efficiency of the method. If the acceleration is less than the above value, then the condensed drops of the liquid phase cannot reach the walls of the device for separation and hence the drops pass out of the device with the main gas flow.

The selection of a location for the separation of the liquid phase of each of the components on the basis of the above relationship increases the efficiency of the method because it permits one to perform, along with the process of condensation of a gas, not only the separation according to the phases "gas-liquid" but also the separation of different liquefied gas components, as these are generated at axially spaced apart locations. Since the dew point depends on the temperature for each of the gas components of the mixture, and the temperature of the gas flow varies along the length of the device, it follows that the domains inside the apparatus in which the process of condensation of each of the component of the gas mixture starts are spaced apart. Moreover, since the process of the phase separation "gas-liquid", under the action of the centrifugal forces, starts after the formation of the first drops of the liquid phase, it follows that the locations at which these drops will reach the lateral walls of the nozzle are also spaced apart. Therefore, it suffices to put devices for the separation of the liquid phase at the places chosen in accordance with the above relationship and then to convey the liquified gas components into a separate collection vessel.

In the general case, the method is performed in this second embodiment with the gas mixture provided with a swirl velocity, that provides a centrifugal acceleration in the flow along its passage through the nozzle of not less than 10,000 g. The parameters of the gas flow at the entrance, to ensure the required values of the acceleration, can be calculated on the basis of the laws of hydrodynamics and the geometry of the nozzle. From the premix chamber, the gas mixture comes to the nozzle and is cooled as a result of the adiabatic expansion; at a distance from the nozzle throat, the process of condensation of the gas component with the highest temperature of transition to the liquid phase (the dew point of the ith component with i=1) starts. Under the action of the centrifugal forces, the formed drops will be thrown to the walls of the apparatus in the area of the wall determined by the relation $$L_1 = V_1 \times \tau_1 \quad (4)$$

These drops then pass out through the first slot 22$^1$. The flow of the remaining gas components forming the mixture travels further along the apparatus and continues cooling. Until in some area of the apparatus that is at a distance from the dew point of the first component, the process of condensation of the second component starts; this component has a lower condensation temperature (the dew point of the second component). Correspondingly, the formed drops of the liquid phase of the second component are subjected to the centrifugal effects and are thrown outwardly to the wall of the apparatus at a distance, from the dew point, that is given by the relation $$L_2=V_2\times\tau_2 \quad (5)$$

More particularly, the drops will contact the inner wall of the cone 20[1] and pass out through the second slot 22[2].

Moving further along the apparatus, the gas mixture continues to expand and to cool and, at some place, reaches the temperature of the phase transition for the third component (the dew point of the third component), and the above process is repeated. Correspondingly, the droplets then collect on the second cone 20[2] and pass out through the third slot 22[3]. The locations at which the dew points of each of the components are found can be determined on the basis of the geometry of the nozzle, the temperature of the phase transition of each of the components, of the characteristics of the input flow, and so on, with the use of the laws and dependencies of gas dynamics and thermodynamics. Respectively, the displacement of the area at which each of the liquid components is collected at the walls of the nozzle and is at a distance, determined by equation $$L_i=V_i\times\tau_i \quad (3)$$

The devices for the separation of the liquid phase of each of the components are located just at these places. Such a device can be realized as in Ref. 2, i.e. as a perforation on the walls of the nozzle at the designed places, and then the liquid will pass through the holes of perforation under the action of the centrifugal forces. Note that a certain proportion of the gas phase in a boundary layer can also be discharged with the liquid, and this gas phase can be separated from the liquid phase by known methods.

Moreover, as shown in the drawing, a preferred element for separation of the liquid components is the provision of a number of generally frusto-conical sections 20[1], 20[2], 20[3], defining corresponding annular slots 22[1], 22[2], 22[3], whose number is equal to the number of components to be separated from the gas mixture. When the drops of the liquid phase reach the walls of the nozzle at the calculated places under the action of the centrifugal forces, a film flow of the liquid starts via these drops; the liquid enters the annular slots and is drawn to appropriate containers. With vertical mounting of the nozzle, i.e. with the gas flow directed downwardly, this process is performed by gravity. In this case, one can exclude the gas phase from flowing into a container with the liquid phase, if one takes the width of slot 22[1], etc., on the basis of the related calculations, so that it is equal to or slightly less than the thickness of the liquid phase film.

EXAMPLE 3

Separation of a multi-component gas mixture into methane, ethane, propane, butane, and a mixture of the remaining gas components.

The method was performed according to the general scheme presented above. The device shown in FIG. 2 was provided with the following parameters: the interior diameter of the premix chamber 1 was 120 mm, the diameter of the nozzle throat is 10 mm, the total length of the device including the nozzle, working section and diffusers and starting from the nozzle throat was 1,800 mm, and the walls of the nozzle are profiled according to the equation (1) above.

To ensure the necessary swirl component to the gas flow, turning vanes were provided at the entrance of the premix chamber 1. The gas was supplied under a pressure of not less than 50 atmospheres to ensure that a swirl velocity was achieved that would generate an acceleration of at least 10,000 g; more particularly a pressure of 65 atmospheres was used. On the basis of the gasdynamical and thermodynamical calculations and with regard to the geometry of the nozzle, the chemical composition, and the gas pressure at the entrance (65 atmospheres), it was established that the dew point for butane (T=0.5° C. under the partial pressure 1.65 atmospheres) was located before the throat at a distance of 200 mm from the nozzle throat, and the optimal place for the separation of the liquefied butane (the separation of 90–95% of butane) was at a distance of 200 mm from its dew point.

The dew point for propane (T=–39° C. under the partial pressure 1.46 atmospheres) was at a distance of 180 mm from the nozzle throat, and the location for separating 90–95% of the liquid propane component was at the distance of 400 mm from the dew point.

Additionally, for methane, the dew point location (T=–161.56° C. under the partial pressure 1.06 atmospheres) was at a distance of 600 mm from the throat nozzle, and separation of the methane liquid phase was then be at a distance of 900 mm from the dew point to ensure the separation of more than 50% of the condensed methane.

After performing the calculations and the installation, according to the results of calculations, devices for the separation of the liquid phase at the calculated places, a gas flow was supplied to the entrance, which consisted of 88.8% of methane, 6% of propane, 3.2% of butane, and 2% of the other gas components, under the pressure of 65 atmospheres with the temperature 290° K.

The process was carried out for one hour under the consumption of 5,000 $nm^3$ per hour. As a result, liquid gas components were obtained: 100 liters of butane, 170 liters of propane, and 2000 liters of methane.

What is claimed is:

1. A method of liquefying a gas, the method comprising the steps of:

(1) applying a swirl velocity to the gas;

(2) passing the gas, with the swirl velocity, through a nozzle whereby the gas adiabatically expands, the gas velocity increases, the gas temperature drops, to promote the condensation of gas with formation of droplets;

(3) passing the gas, with the swirl velocity, further through a working section having a wall, whereby further condensation of at least a portion of the gas flow occurs and droplets of condensed gas grow;

(4) permitting centrifugal effects generated by the swirl velocity to drive the droplets towards the wall of the working section; and (5) separating condensed liquid gas droplets from remaining gas in the gaseous state at least adjacent the wall of the working section.

2. A method as claimed in claim 1, which includes separating condensed liquid from the gas flow in the working section at a location spaced a distance L from the dew point of the liquefied gas component, where $L=V\tau$, where V is the speed of the gas flow at the outcome of the nozzle and $\tau$ is the time taken for condensed droplets of gas to travel from the axis of the nozzle to a wall of the working section.

3. A method as claimed in claim 2, which includes applying a swirl component to the gas such that the gas is subject to centrifugal acceleration of greater than 10,000 g near the wall of the working section.

4. A method as claimed in claim 1, 2 or 3, which includes separating condensed droplets through an annular slot.

5. A method as claimed in claim 1, 2 or 3, which includes separating condensed droplets through perforations.

6. A method as claimed in claim 1, which includes applying the method to a gas comprising a plurality of separate gaseous components having different properties, and the method further comprising adiabatically expanding the gas such that at least two gaseous components commence condensation at different axial locations downstream from the nozzle throat, to form the droplets and separating out the droplets of these gaseous components independently from each other gaseous component.

7. A method as claimed in claim 6, which includes collecting the condensed droplets of each gaseous component through perforations in a wall of working section.

8. A method as claimed in claim 6, which includes collecting the droplets of each condensed gaseous component through a respective annular slot.

9. A method as claimed in claim 8, which includes providing each annular slot at a location which is a distance $L_i$ from the axial location at which a corresponding gaseous component condenses, where $L_i$ is determined by the relationship $L_i=V_i \times \tau_i$, where $L_i$ is the distance between the dew point of the ith gas component to a location at which the ith gaseous component is separated; $V_i$ is the speed of the gas flow at the dew point of the ith gaseous component and $\tau_i$ is the time for droplets of the ith gaseous component to travel from the axis of the nozzle to the working section wall.

10. A method as claimed in claim 9, wherein the swirl component or velocity applied to the gas flow is such as to create a centrifugal acceleration of at least 10,000 g.

11. A method as claimed in claim 9, which includes applying the method to natural gas including methane, ethane, propane and butane as its main components.

12. A method as claimed in any one of claims 6 to 11, which includes providing the gaseous components at partial pressures selected such that, for one component having a lower temperature of condensation at atmospheric pressure than the temperature of condensation at atmospheric pressure of another component, said one component condenses first to form droplets containing at least part of said other component dissolved therein, and the method including separating said droplets from the gas.

13. A method as claimed in claim 6, which includes applying the method to separation of methane and ethane.

14. A method as claimed in any one of claims 1 to 3, 6 to 11, and 13, which includes in step (3) generating a substantially sonic velocity in the gas close to the nozzle throat, and causing the gas to expand supersonically in the working section.

15. An apparatus for liquefying a gas, the apparatus comprising:

(1) means for imparting a swirl component of velocity to a gaseous flow;

(2) downstream from said swirl generation means, a nozzle comprising a convergent nozzle portion connected to the swirl generation means and a nozzle throat, and a divergent working section, whereby in use, the gas adiabatically expands in the working section to cause condensation of at least some of the gas, thereby generating droplets of condensed gas.

16. An apparatus as claimed in claim 15, wherein the working section has a wall and the divergence angle of the wall is chosen to compensate for growth of a boundary layer.

17. An apparatus as claimed in claim 16, including a separation means connected to the working section, for separating condensed droplets from the gas.

18. An apparatus as claimed in claim 17, wherein the separation means includes perforations for separating out gas droplets.

19. An apparatus as claimed in claim 17, wherein the separation means includes at least one annular slot for separating out droplets of condensed gas.

20. An apparatus as claimed in claim 19, wherein the separation means includes a plurality of annular slots axially spaced along the working section, for separating out droplets of different condensed gaseous components, for enabling the separation of different gaseous components of a gas mixture.

21. An apparatus as claimed in claim 20, wherein each of the annular slots is located a distance $L_i$ from the axial location at which a corresponding gaseous component condenses, where $L_i$ is determined by the relationship $L_i=V_i \times \tau_i$, where $L_i$ is the distance between the dew point of the ith gas component to a location at which the ith gaseous component is separated; $V_i$ is the speed of the gas flow at the dew point of the ith gaseous component and $\tau_i$ is the time for droplets of the ith gaseous component to travel from the axis of the nozzle to a wall of the working section.

22. An apparatus as claimed in claim 17, wherein the swirl generation means is capable of generating a swirl velocity which generates a centrifugal acceleration equal to or greater than 10,000 g.

23. An apparatus as claimed in claim 16 or any one of claims 17 to 22, including means for supplying gas at a sufficient pressure to generate a supersonic expansion in the working section.

24. An apparatus as claimed in claim 23, wherein the nozzle includes a divergent portion extending between the nozzle throat and the working section, for initial expansion and acceleration of the gas to supersonic velocities.

25. An apparatus as claimed in claim 16 or any one of claims 17 to 22, which includes a diffuser body located downstream from the working section, for recovering kinetic energy as increased pressure.

26. An apparatus as claimed in claim 25, which includes an annular slot extending around the diffuser body, for separation of liquid droplets, which annular slot includes an inner leading edge, wherein said inner leading edge is provided in the diffuser body.

27. An apparatus as claimed in claim 25, wherein the diffuser body defines a supersonic diffuser, an intermediate portion and a subsonic diffuser.

28. An apparatus as claimed in claim 27, wherein the subsonic diffuser includes means for removing the swirl component of the velocity and recovering the rotational kinetic energy as axial kinetic energy, thereby to enable conversion of the axial kinetic energy into increased pressure.

29. An apparatus as claimed in claim 26, wherein the diffuser body defines a supersonic diffuser, an intermediate portion and a subsonic diffuser.

30. An apparatus as claimed in claim 29, wherein the subsonic diffuser includes means for removing the swirl component of the velocity and recovering the rotational kinetic energy as axial kinetic energy, thereby to enable conversion of the axial kinetic energy into increased pressure.

* * * * *